United States Patent
Yuille et al.

(10) Patent No.: US 8,892,330 B2
(45) Date of Patent: *Nov. 18, 2014

(54) HYBRID VEHICLE WITH CYLINDER DEACTIVATION

(71) Applicant: Tula Technology, Inc., San Jose, CA (US)

(72) Inventors: Ronald D. Yuille, Sarasota, FL (US); Mark A. Shost, Northville, MI (US); Louis J. Serrano, Los Gatos, CA (US); John W. Parsels, San Jose, CA (US); Matthew A. Younkins, San Jose, CA (US)

(73) Assignee: Tula Technology, Inc., San Jose, CA (US)

( * ) Notice: Subject to any disclaimer, the term of this patent is extended or adjusted under 35 U.S.C. 154(b) by 230 days.

This patent is subject to a terminal disclaimer.

(21) Appl. No.: 13/654,217

(22) Filed: Oct. 17, 2012

(65) Prior Publication Data

US 2013/0096758 A1 Apr. 18, 2013

Related U.S. Application Data

(60) Provisional application No. 61/548,188, filed on Oct. 17, 2011.

(51) Int. Cl.
| | | |
|---|---|---|
| *G06F 17/00* | (2006.01) | |
| *B60W 10/06* | (2006.01) | |
| *B60W 10/08* | (2006.01) | |
| *B60W 20/00* | (2006.01) | |
| *B60K 6/485* | (2007.10) | |

(52) U.S. Cl.
CPC ............... *B60W 10/06* (2013.01); *B60W 10/08* (2013.01); *B60W 20/00* (2013.01); *B60K 6/485* (2013.01); *B60W 20/1082* (2013.01); *Y02T 10/6286* (2013.01); *B60W 2510/244* (2013.01); *B60W 2710/0666* (2013.01); *B60W 2710/083* (2013.01); *Y02T 10/6226* (2013.01)
USPC .......................................................... 701/84

(58) Field of Classification Search
CPC ........... G01M 15/11; F02D 2200/1015; F02D 2250/18; B60W 2710/0666; B60W 10/06
USPC ............. 701/22, 84–87, 101, 102; 73/114.02; 123/350, 98 F; 180/65.1, 65.21, 65.285; 477/7
See application file for complete search history.

(56) References Cited

U.S. PATENT DOCUMENTS

| | | |
|---|---|---|
| 4,434,767 A | 3/1984 | Kohama et al. |
| 4,489,695 A | 12/1984 | Kohama et al. |

(Continued)

FOREIGN PATENT DOCUMENTS

| | | |
|---|---|---|
| JP | 2004-068759 | 3/2004 |
| WO | WO 2005/073004 | 8/2005 |

OTHER PUBLICATIONS

Written Opinion dated Mar. 27, 2013 in International Application No. PCT/US2012/060674.

(Continued)

*Primary Examiner* — Mary Cheung
(74) *Attorney, Agent, or Firm* — Beyer Law Group LLP

(57) ABSTRACT

A variety of methods and arrangements for operating an internal combustion engine and one or more motor/generators in a hybrid vehicle are described. Generally, the engine is operated in a variable displacement or skip fire mode. Depending on the state of charge of an energy storage device and/or other factors, the engine is operated to generate more or less than a desired level of torque. The one or more motor/generators are used to add or subtract torque so that the motor/generator(s) and the engine collectively deliver the desired level of torque. In some embodiments, the engine may be run with a substantially open throttle to reduce pumping losses and improve fuel efficiency.

19 Claims, 9 Drawing Sheets

(56) References Cited

U.S. PATENT DOCUMENTS

| | | | |
|---|---|---|---|
| 4,509,488 A | 4/1985 | Forster et al. | |
| 5,377,631 A | 1/1995 | Schechter | |
| 5,806,617 A | 9/1998 | Yamaguchi | |
| 5,975,052 A | 11/1999 | Moyer | |
| 6,006,157 A * | 12/1999 | Dai et al. | 701/114 |
| 6,158,411 A | 12/2000 | Morikawa | |
| 6,364,807 B1 | 4/2002 | Koneda | |
| 6,441,506 B2 | 8/2002 | Nakashima | |
| 6,487,998 B1 | 12/2002 | Masberg et al. | |
| 6,494,087 B2 * | 12/2002 | Hatano et al. | 73/114.02 |
| 6,619,258 B2 | 9/2003 | McKay et al. | |
| 6,691,807 B1 | 2/2004 | Bhavsar et al. | |
| 6,692,404 B2 | 2/2004 | Matsubara et al. | |
| 6,718,937 B2 | 4/2004 | Kim | |
| 6,746,366 B2 | 6/2004 | Tamor | |
| 6,886,524 B2 | 5/2005 | Hanada et al. | |
| 6,943,460 B2 | 9/2005 | Wakashiro et al. | |
| 6,986,399 B2 | 1/2006 | Bhavsar et al. | |
| 7,021,409 B2 | 4/2006 | Tamor | |
| 7,059,997 B2 | 6/2006 | Nishizawa et al. | |
| 7,063,062 B2 | 6/2006 | Lewis et al. | |
| 7,085,647 B1 | 8/2006 | Prucka et al. | |
| 7,086,386 B2 | 8/2006 | Doering | |
| 7,104,244 B2 | 9/2006 | Nishi et al. | |
| 7,225,782 B2 | 6/2007 | Pallett et al. | |
| 7,225,783 B2 | 6/2007 | Hohnstadt et al. | |
| 7,232,401 B2 | 6/2007 | Albertson | |
| 7,240,749 B2 | 7/2007 | Bhavsar et al. | |
| 7,275,518 B1 | 10/2007 | Gartner et al. | |
| 7,275,916 B2 | 10/2007 | Smith et al. | |
| 7,278,392 B2 | 10/2007 | Zillmer et al. | |
| 7,308,886 B2 * | 12/2007 | Balles et al. | 123/321 |
| 7,308,959 B2 | 12/2007 | Roberts | |
| 7,320,300 B2 | 1/2008 | Lewis et al. | |
| 7,350,499 B2 | 4/2008 | Takaoka et al. | |
| 7,426,915 B2 | 9/2008 | Gibson et al. | |
| 7,456,509 B2 | 11/2008 | Gray, Jr. | |
| 7,503,312 B2 | 3/2009 | Surnilla et al. | |
| 7,530,413 B2 | 5/2009 | Rayl | |
| 7,577,511 B1 | 8/2009 | Tripathi et al. | |
| 7,580,779 B2 | 8/2009 | Zillmer et al. | |
| 7,751,963 B2 | 7/2010 | Gecim et al. | |
| 7,775,310 B2 | 8/2010 | Andri | |
| 7,849,835 B2 | 12/2010 | Tripathi et al. | |
| 7,867,134 B2 | 1/2011 | Choi | |
| 7,886,715 B2 | 2/2011 | Tripathi et al. | |
| 7,930,087 B2 | 4/2011 | Gibson et al. | |
| 7,946,275 B2 | 5/2011 | McDonald et al. | |
| 7,950,359 B2 | 5/2011 | Choi | |
| 7,954,474 B2 | 6/2011 | Tripathi et al. | |
| 7,972,235 B2 | 7/2011 | Usoro et al. | |
| 8,015,960 B2 | 9/2011 | Watanabe | |
| 8,099,224 B2 | 1/2012 | Tripathi et al. | |
| 8,131,445 B2 | 3/2012 | Tripathi et al. | |
| 8,131,447 B2 | 3/2012 | Tripathi et al. | |
| 8,135,532 B2 | 3/2012 | Heap et al. | |
| 8,145,410 B2 | 3/2012 | Berger et al. | |
| 8,251,044 B2 | 8/2012 | Russell et al. | |
| 8,336,521 B2 | 12/2012 | Tripathi et al. | |
| 8,473,179 B2 | 6/2013 | Whitney et al. | |
| 2002/0170527 A1 | 11/2002 | Rayl et al. | |
| 2006/0086546 A1 | 4/2006 | Hu et al. | |
| 2006/0130814 A1 | 6/2006 | Bolander et al. | |
| 2008/0135021 A1 | 6/2008 | Michelini et al. | |
| 2008/0154468 A1 | 6/2008 | Berger et al. | |
| 2008/0185194 A1 | 8/2008 | Leone | |
| 2009/0084618 A1 | 4/2009 | Thompson et al. | |
| 2009/0105896 A1 | 4/2009 | Tamai et al. | |
| 2010/0050993 A1 | 3/2010 | Zhao et al. | |
| 2010/0211297 A1 | 8/2010 | Doering et al. | |
| 2011/0030657 A1 | 2/2011 | Tripathi et al. | |
| 2011/0130902 A1 | 6/2011 | Heisel et al. | |
| 2011/0144838 A1 | 6/2011 | Matthews et al. | |
| 2011/0213540 A1 | 9/2011 | Tripathi et al. | |
| 2011/0251773 A1 | 10/2011 | Sahandiesfanjani et al. | |
| 2012/0031357 A1 | 2/2012 | Ervin et al. | |
| 2012/0109495 A1 | 5/2012 | Tripathi et al. | |
| 2012/0143471 A1 | 6/2012 | Tripathi et al. | |
| 2013/0066502 A1 | 3/2013 | Tripathi et al. | |
| 2013/0092127 A1 | 4/2013 | Pirjaberi et al. | |

OTHER PUBLICATIONS

International Search report dated Mar. 27, 2013 in International Application No. PCT/US2012/060674.
International Preliminary Report on Patentability dated Jan. 3, 2014 from International Application No. PCT/US2012/060674.
International Preliminary Report on Patentability dated Oct. 4, 2013 from International Application No. PCT/US2012/65944.
International Search Report dated Feb. 7, 2013, from PCT/US2012/065944.
Written Opinion dated Feb. 7, 2013, from PCT/US2012/065944.
Notice of Allowance dated Sep. 12, 2014 from U.S. Appl. No. 13/681,378.

* cited by examiner

HYBRID VEHICLE WITH CYLINDER DEACTIVATION

CROSS REFERENCE TO RELATED APPLICATIONS

This application claims priority to U.S. Provisional Patent Application No. 61/548,188, entitled "Hybrid Vehicle with Cylinder Deactivation," filed Oct. 17, 2011, which is hereby incorporated by reference in its entirety for all purposes.

FIELD OF THE INVENTION

The present invention relates generally to using variable displacement or skip fire control mechanisms in an internal combustion engine. More specifically, such mechanisms are used in a hybrid vehicle with an energy storage device and an energy transformation device (e.g., an electric motor/generator). The output of the engine and electric motor/generator are coordinated to deliver a desired amount of torque.

BACKGROUND

Most vehicles in operation today are powered by internal combustion (IC) engines. Internal combustion engines typically have a plurality of cylinders or other working chambers where combustion occurs. Under normal driving conditions, the torque generated by an internal combustion engine needs to vary over a wide range in order to meet the operational demands of the driver. Over the years, a number of methods of controlling internal combustion engine torque have been proposed and utilized. Some such approaches contemplate varying the effective displacement of the engine. In conventional variable displacement engine operation, a fixed set of cylinders are deactivated during low-load operating conditions. For example, an eight cylinder engine may fire all eight cylinders, then drop to a four cylinder mode (in which four cylinders are fired and four are deactivated). Cylinder deactivation during low-load operating conditions can help reduce fuel consumption.

Some approaches involve operating a variable displacement engine (VDE) in a hybrid electric vehicle. One such approach is described in the U.S. Pat. No. 7,225,782 (hereinafter referred to as the '782 patent). The '782 patent relates to a technology for controlling engine torque during transitions between VDE modes. In the invention described in the '782 patent, as the engine transitions between states involving different numbers of cylinders, the throttle is substantially adjusted to control the torque output of each cylinder.

While the above approaches work well for various applications, there are ongoing efforts to further improve fuel efficiency and engine output in hybrid powertrain systems.

SUMMARY OF THE INVENTION

A variety of methods and arrangements for operating an internal combustion engine in a variable displacement or skip fire mode in a hybrid electric vehicle are described. Some embodiments involve a skip fire engine control system that uses a set of preferred firing fractions. Depending on the state of charge of an energy storage device and/or other operating parameters, a firing fraction is selected that causes the engine to generate more or less than the desired level of torque. One or more electric motor/generators (M/G) are used to add or subtract torque, which causes the energy storage device to be discharged or charged and helps ensure that the desired amount of torque is delivered. In some implementations, the number of selectable firing fractions is not fixed and a continuously variable skip fire engine control system is used.

Various engine designs involve variable displacement engine control in which a particular engine state or number of working chambers are selected for firing, while the remaining working chambers are deactivated. Ideally, during the firing of the working chambers, the throttle is kept substantially open or at a position that is optimal given engine operating conditions. An engine state is selected based on the current and desired state of charge of an energy storage device and/or other operating parameters so that an excess or insufficient amount of engine torque is generated relative to a desired torque level. One or more electric motor/generators are operated to add to or subtract from the engine torque. The output of the engine and electric motor/generator(s) are coordinated to deliver the requested torque.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention relates generally to methods and mechanisms for variable displacement or skip fire engine operation in a hybrid electric vehicle.

Figure 1:
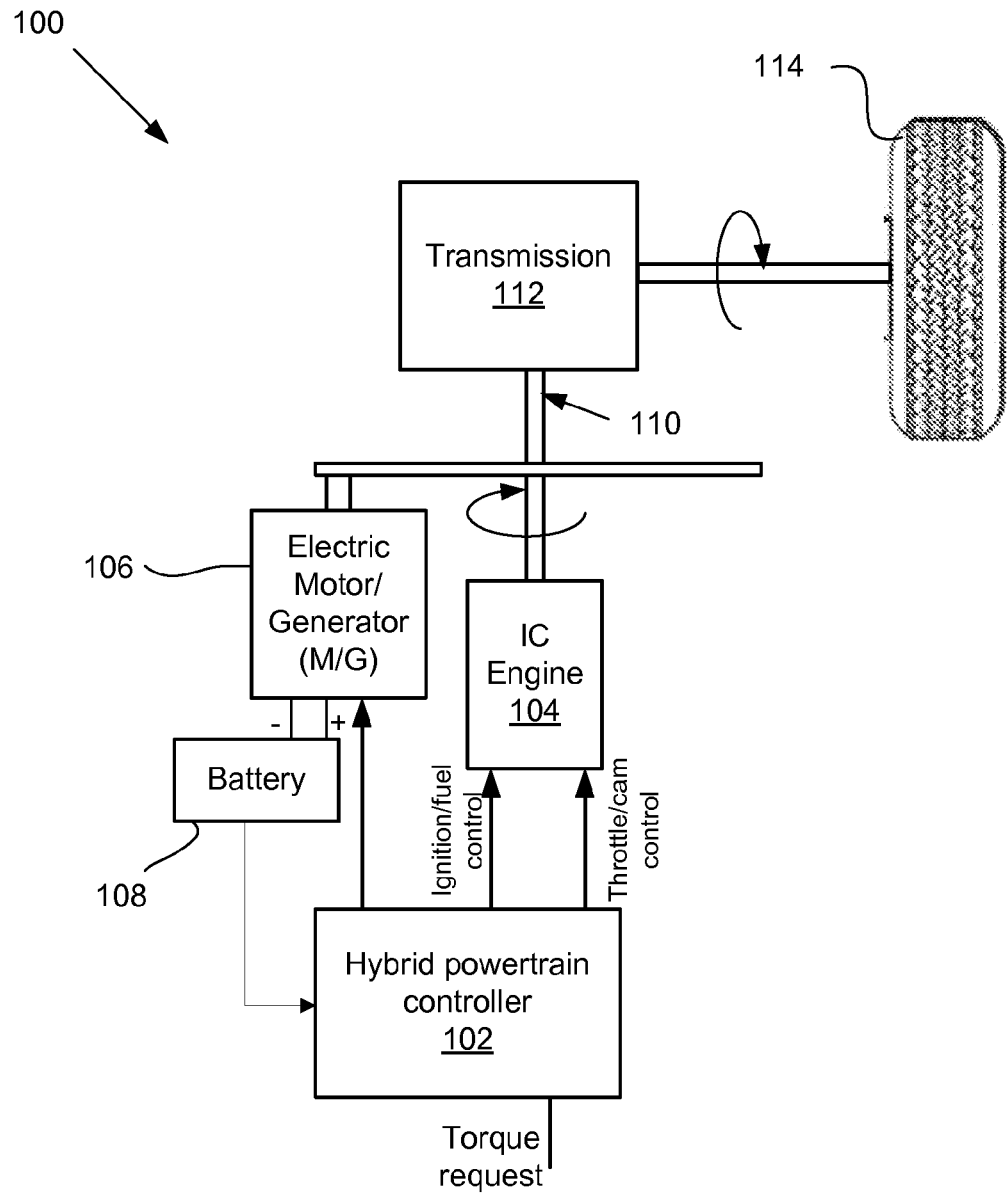
FIG. 1 is a diagram of a hybrid powertrain system according to one embodiment of the present invention.

FIG. 1 is a functional block diagram that diagrammatically illustrates components of a hybrid electric vehicle control system 100 in accordance with one embodiment of the present invention. The components include a hybrid powertrain controller 102, an internal combustion (IC) engine 104, an electric motor/generator (M/G) 106 and an energy storage device. In the illustrated embodiment, the energy storage device is a battery 108, although any suitable energy storage device may be used. The electric M/G 106 and the IC engine 104 are arranged to deliver torque to the drive shaft 110. The electric M/G 106 is also arranged to subtract torque from the drive shaft 110 to recharge the battery. The drive shaft 110 turns the transmission 112, which in turn is connected to and drives the wheels 114 of the vehicle.

The hybrid powertrain controller 102 receives input signals from the battery, the driver (e.g., through use of the accelerator pedal, brake pedal and gear selector) and other sources as appropriate. Based on these input signals and other operational parameters, the hybrid powertrain controller 102 coordinates the illustrated subcomponents so that the desired torque is delivered by the electric M/G 106 and the IC engine 104.

In some embodiments, the hybrid powertrain controller 102 is arranged to operate the IC engine 104 in a skip fire manner. Skip fire engine operation involves firing selected working cycles of selected working chambers and deactivating selected working cycles of selected working chambers. As a result, individual working chambers may be fired during one working cycle, and then deactivated during the next working cycle. The assignee of the present application has filed multiple patent applications on various skip fire engine designs, such as U.S. Pat. Nos. 7,954,474; 7,886,715; 7,849, 835; 7,577,511; 8,099,224; 8,131,445; and 8,131,447; U.S. patent application Ser. Nos. 13/004,839 and 13/004,844; and U.S. Provisional Patent Application Nos. 61/639,500; 61/672,144; 61/441,765; 61/682,065; 61/677,888; 61/683, 553; 61/682,151; 61/682,553; 61/682,135; 61/682,168; 61/080,192; 61/104,222; and 61/640,646, each of which is incorporated herein by reference in its entirety for all purposes. Any of the described skip fire designs can be integrated into the present invention.

The hybrid powertrain controller 102 may also use variable displacement engine control. For example, the hybrid powertrain controller 102 may operate the engine 104 to fire a set number of working chambers while the other working chambers are deactivated. As previously noted, there have been efforts to use variable displacement engine control in hybrid electric vehicles. However, such efforts have generally involved using the air intake throttle as a primary means of controlling the torque generated by each fired working chamber. In the described embodiments, the throttle is instead kept substantially open or is set at a position that is optimal given current engine operating conditions. The electric M/G 106 is used to subtract or add torque as appropriate such that any desired level of torque can be delivered.

Although a substantially open air intake throttle is preferred, this does not necessarily mean that the throttle is always fully open or in a fixed position. The exact throttle position may vary, depending on various engine parameters, such as engine speed. Under some operating conditions, a full or nearly full throttle is optimal, while under other conditions, a somewhat less open throttle is more effective. In still other operating conditions, partially throttled operation may be desired.

The present invention contemplates any suitable arrangement of the electric M/G 106, IC engine 104, drive shaft 110 and other components of the hybrid powertrain system 100 and is not limited to what is shown in the figures. "Pure" parallel hybrid systems, "mild" hybrid systems or any suitable hybrid architecture may be used in connection with the described embodiments. Additionally, a wide variety of batteries and energy storage devices may be used in connection with the present invention. Instead of the battery 108, some applications may use one or more capacitors, hydraulic energy storage devices, mechanical energy storage devices (e.g., a flywheel) or any other suitable device for storing and/or discharging energy.

Figure 2:
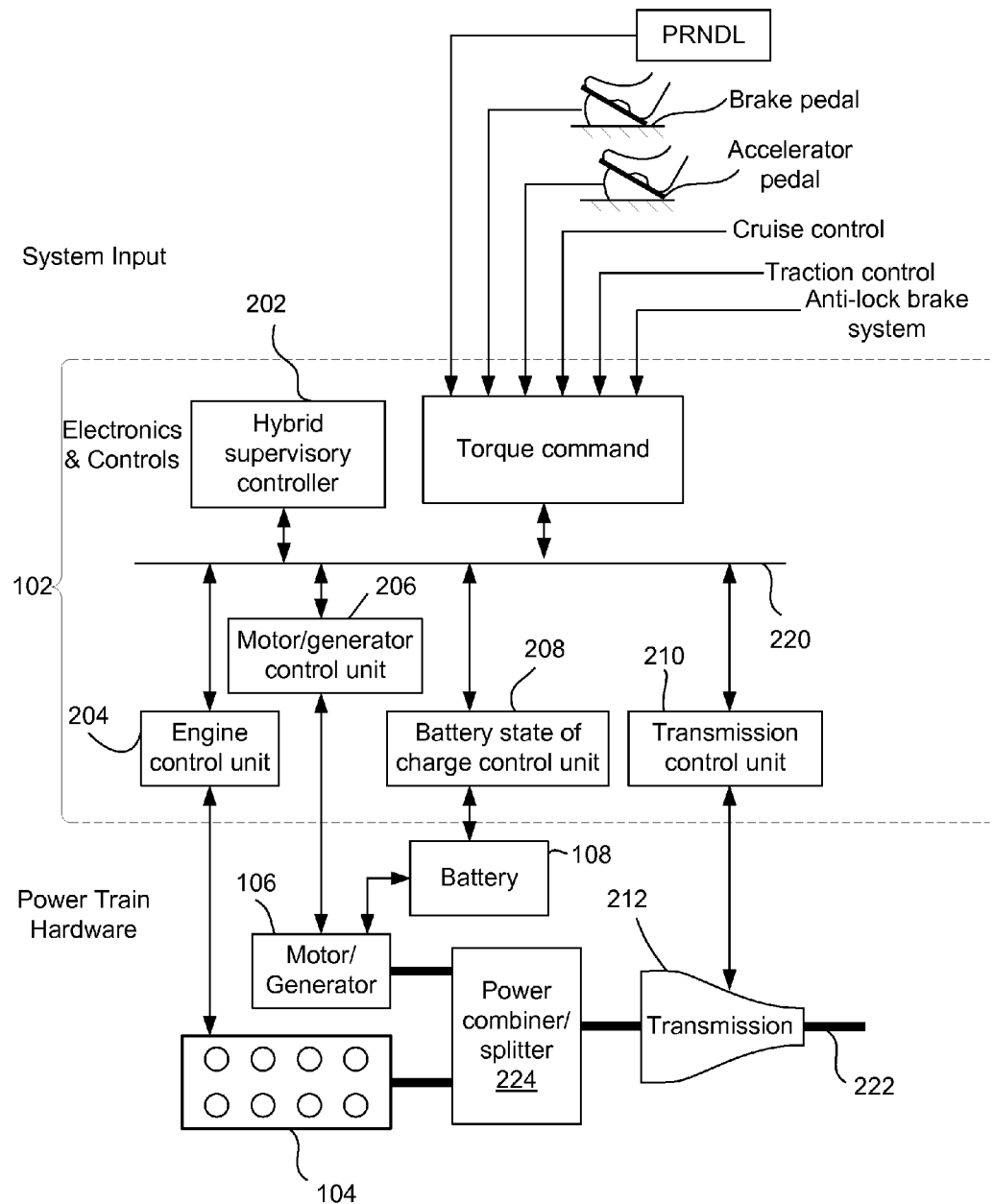
FIG. 2 is a flow chart that diagrammatically illustrates a hybrid powertrain controller according to one embodiment of the present invention.

Referring next to FIG. 2, the hybrid powertrain controller 102 of FIG. 1 in accordance with one embodiment of the present invention will be described. The hybrid powertrain controller 102 includes a hybrid supervisory controller 202, an engine control unit 204, a motor/generator control (M/G) unit 206, a battery state of charge control unit 208 and a transmission control unit 210. A communication bus 220 links the various components and allows them to communicate with one another. The engine control unit 204, the motor/generator control unit 206 and the transmission control unit 210 are arranged to receive input from the hybrid supervisory controller 202 and operate the engine 104, the motor/generator 106 and the transmission 212, respectively. In the illustrated embodiment, the engine 104 and the motor/generator 106 are connected to the driveline 222 and the transmission 212 through a power combiner/splitter 224 and are arranged to separately or collectively supply torque to power the vehicle.

Figure 3:
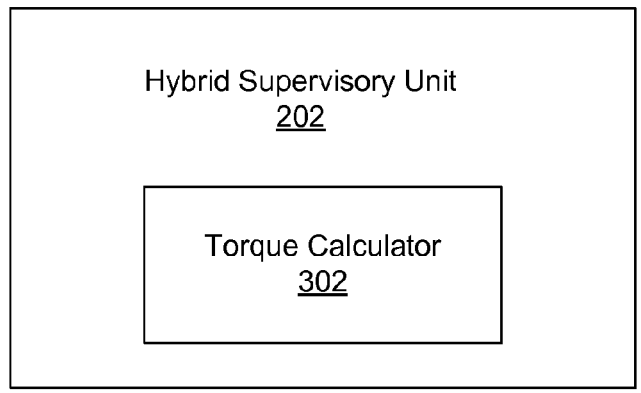
FIG. 3 is a diagram of a hybrid supervisory unit according to one embodiment of the present invention.

The hybrid supervisory controller 202 coordinates the operation of the other modules, the engine 104 and the electric M/G 106. In the illustrated embodiment, the hybrid supervisory controller 202 receives torque commands from the brake pedal, accelerator pedal, cruise control, gear setting (PRNDL), traction control, anti-lock brake system or any other suitable source. As shown in FIG. 3, the hybrid supervisory controller includes a torque calculator 302. The torque calculator 302 is arranged to determine the desired torque. In addition to the torque commands, there are a number of inputs that may influence or dictate the desired torque at any time. Other primary inputs may come from a transmission controller (e.g., for torque management during a shift event), the hybrid supervisory controller, etc. When such factors are utilized in the torque calculations, then the appropriate inputs, such as engine speed are also provided or are obtainable by the torque calculator 302 as necessary.

The hybrid supervisory controller 202 also receives input signals from the battery state of charge control unit 208. The input signals help indicate whether charging or discharging of the battery is appropriate. Based on these input signals, the torque commands, the desired torque and/or other operating conditions, the hybrid supervisory controller 202 helps determine the torque output of the engine 104 and the electric M/G 106. Generally, if the battery charge level falls below a particular threshold, the battery state of charge control unit 208 sends a signal indicating a desire to charge to the hybrid supervisory controller 202 and engine control unit 204 directs the engine 104 to generate a greater amount of torque than the desired torque. In this situation, the hybrid supervisory control 202 and the M/G control unit 206 direct the electric M/G 106 to absorb the excess torque and use it to charge the battery 108. If the battery charge level is above a particular threshold, the hybrid supervisory controller 202 and engine control unit 204 may direct the engine 104 to generate a lower amount of torque than the desired torque. The electric M/G 106 discharges the battery to supply additional torque and compensate for the torque deficit. In this manner, the hybrid supervisory controller 202 helps coordinate the engine control unit 204 and the M/G control unit 206 so that they collectively deliver the desired torque.

Figure 4:
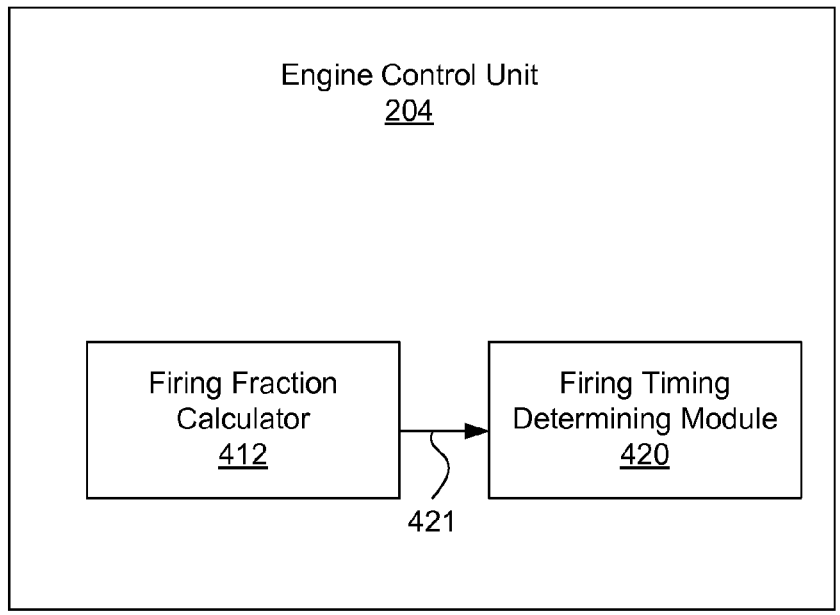
FIG. 4 is a diagram of an engine control unit using skip fire engine control according to one embodiment of the present invention.

Some embodiments involve an engine control unit 204 that is arranged to operate the engine in a skip fire manner. An example of such an engine control unit 204 is illustrated in FIG. 4. The engine control unit 204 includes a firing fraction calculator 412 and a firing timing determining module 420. In the illustrated embodiment, the firing fraction calculator 412 receives a target engine torque level from the hybrid supervisory controller 202 and is arranged to determine a skip fire firing fraction that would be appropriate to deliver the target engine torque level under selected engine operating conditions. (In other embodiments, the target engine torque level is received from another component or generated within the engine control unit 204 using input from the hybrid supervisory controller 202.) The firing fraction is indicative of the percentage of firings under the current (or directed) operating conditions that are required to deliver the target output. In some embodiments, a firing fraction is understood as the ratio of active working chamber events to total working chamber events. Under some conditions, the firing fraction may be determined based on the percentage of optimized firings that are required to deliver the desired IC engine torque (e.g., when the working chambers are firing at an operating point substantially optimized for fuel efficiency). The firing fraction may be based on any number of factors including the desired torque, the target engine torque level, the current engine speed, and other operating or environmental parameters, such as, the cylinder mass air charge (MAC), the transmission gear, etc. The firing fraction calculator 412 transmits the commanded firing fraction 421 to the firing timing determining module 420.

The firing timing determining module 420 is arranged to issue a sequence of firing commands that cause the engine 104 to deliver the percentage of firings dictated by a commanded firing fraction 421. The firing timing determining module 420 may take a wide variety of different forms. For example, in some embodiments, the firing timing determining module 420 utilizes various types of lookup tables to implement the desired control algorithms. In other embodiments, a sigma delta converter or other mechanisms are used. The sequence of firing commands outputted by the firing timing determining module 420 may be passed to the engine control unit 204 or a combustion controller which orchestrates the actual firings in accordance with the commanded firing fraction 421.

Some implementations involve continuously variable skip fire control. That is, the firing fraction calculator 412 is arranged to select almost any suitable commanded firing fraction. Such an approach allows a high degree of control over the output of the engine. In turn, this allows greater control over the amount of excess torque that is used to charge the battery or the size of the torque deficit that the battery is required to compensate for.

In other embodiments, a predefined set of firing fractions are used. Certain firing fractions tend to have better noise, vibration and harshness (NVH) characteristics than others. As a result, it is sometimes desirable that these predetermined operating levels (also expressed as firing fractions) are used to operate the engine. A challenge is that a mechanism must be provided to regulate the output of the engine in a manner that provides the vehicle performance desired by the driver. In spark ignition engines, this is typically accomplished in large part by varying the throttle position, although other parameters such as valve timing, spark timing etc. are also sometimes controlled to modulate the engine output. One common drawback of each of these approaches is that they reduce the overall fuel efficiency of the vehicle. This challenge can be addressed by using skip fire engine control in combination with the electric M/G 106. That is, depending on the state of the battery 108, the firing fraction selection and M/G operation can be coordinated to deliver any desired torque.

Figure 5A:
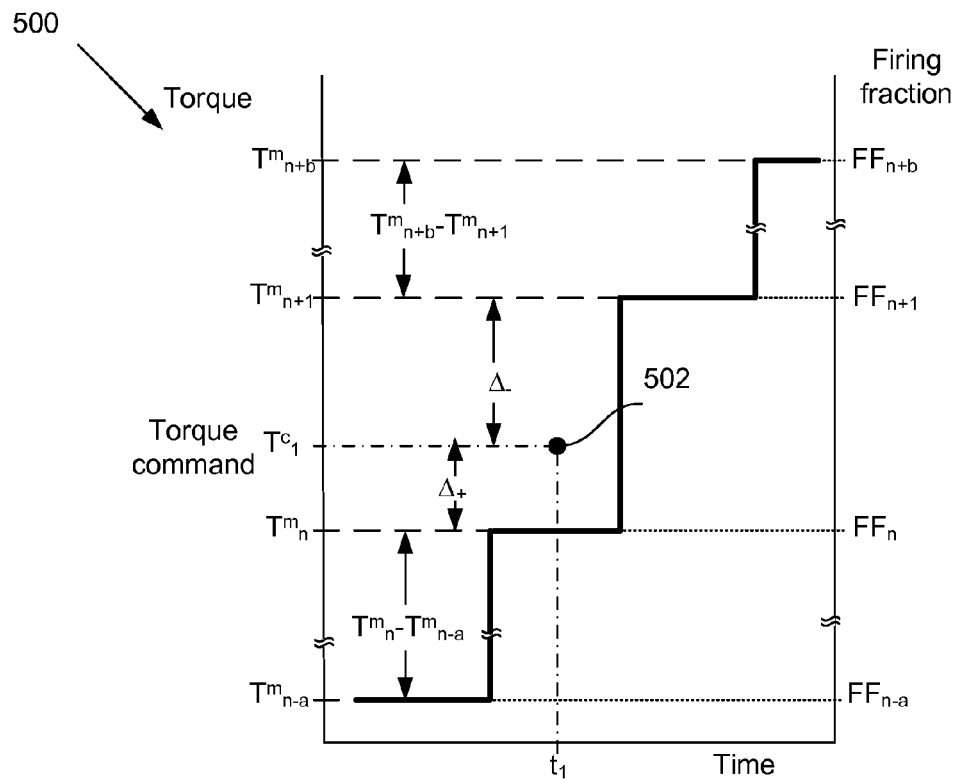
FIG. 5A is a graph illustrating different possible engine torque levels and firing fractions according to one embodiment of the present invention.
Figure 5B:
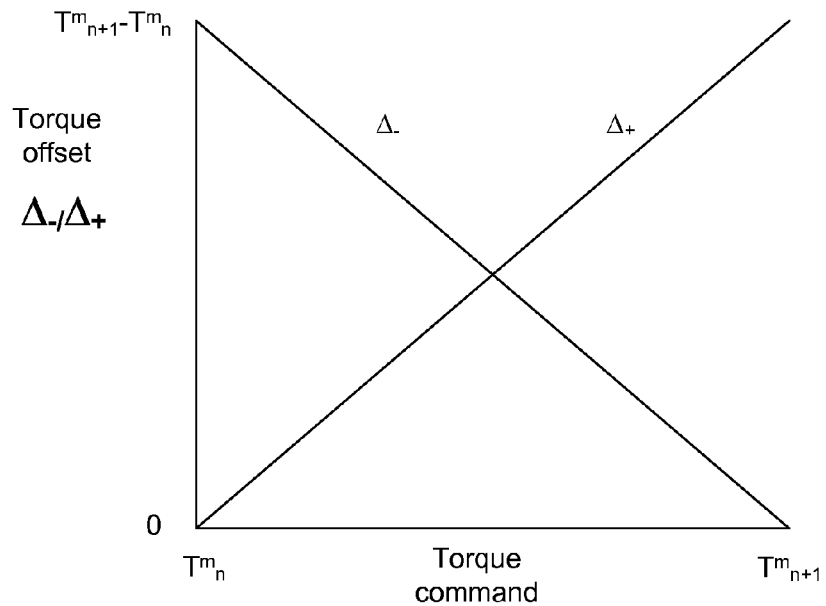
FIG. 5B is a graph illustrating the relationship between positive and negative offsets and the commanded torque of FIG. 5A.

One example approach will be discussed in connection with FIGS. 5A, 5B and 6. FIG. 5A is a diagram 500 illustrating a set of engine 104 torque levels ($T^m_{n-a}, \ldots T^m_n, T^m_{n+1}, \ldots T^m_{n+b}$) that correspond to a predetermined, selectable set of firing fractions ($FF_{n-a}, \ldots FF_n, FF_{n+1}, \ldots FF_{n+b}$) with favorable NVH characteristics at a given engine speed and operating conditions. Other torque levels may correspond to other firing fractions that are not available for selection and/or have worse NVH characteristics. In this example, the desired torque level is $T^c_1$ at time $t_1$, as indicated by operating point 502. The desired torque level $T^c_1$ is greater than torque level $T^m_n$ but less than torque level $T^m_{n+1}$. None of the predetermined firing fractions would exactly generate the desired torque level $T^c_1$ under current operating conditions. The firing fractions that would come closest to doing so are $FF_n$, which corresponds to torque level $T^m_n$, and $FF_{n+1}$, which corresponds to torque level $T^m_{n+1}$.

In the figure, the torque difference between the closest higher engine torque level, $T^m_{n+1}$ (which is generated by the higher firing fraction $FF_{n+1}$) and the desired torque $T^c_1$ is a negative offset, $\Delta_-$. The torque difference between the desired torque $T^c_1$ and closest lower engine torque level, $T^m_n$ (which is generated by the lower firing fraction $FF_n$) is a positive offset, $\Delta_+$. Thus, as indicated in FIG. 6, the desired or commanded torque can be reached by either adding the positive offset to the lower adjacent engine torque level or subtracting the negative offset from the higher adjacent engine torque level, i.e. $T^c_1 = T^m_n + \Delta_+ = T^m_{n+1} - \Delta_-$. As $T^c_1$ increases from $T^m_n$ to $T^m_{n+1}$, $\Delta_-$ decreases from $T^m_{n+1} - T^m_n$ to zero and $\Delta_+$ increases from zero to $T^m_{n+1} - T^m_n$. (This relationship is illustrated in the graph of FIG. 5B.)

In this example, the selection of the appropriate engine torque level and firing fraction depends at least in part on input from the battery state of charge control unit 208. The hybrid supervisory controller 202 receives input signals from the battery state of charge control unit 208 indicating one of the following states, which for ease of reference are named as follows:

1) CHARGE COMMAND
2) PREFERENTIAL CHARGE
3) PREFERENTIAL DISCHARGE
4) DISCHARGE COMMAND

Figure 6:
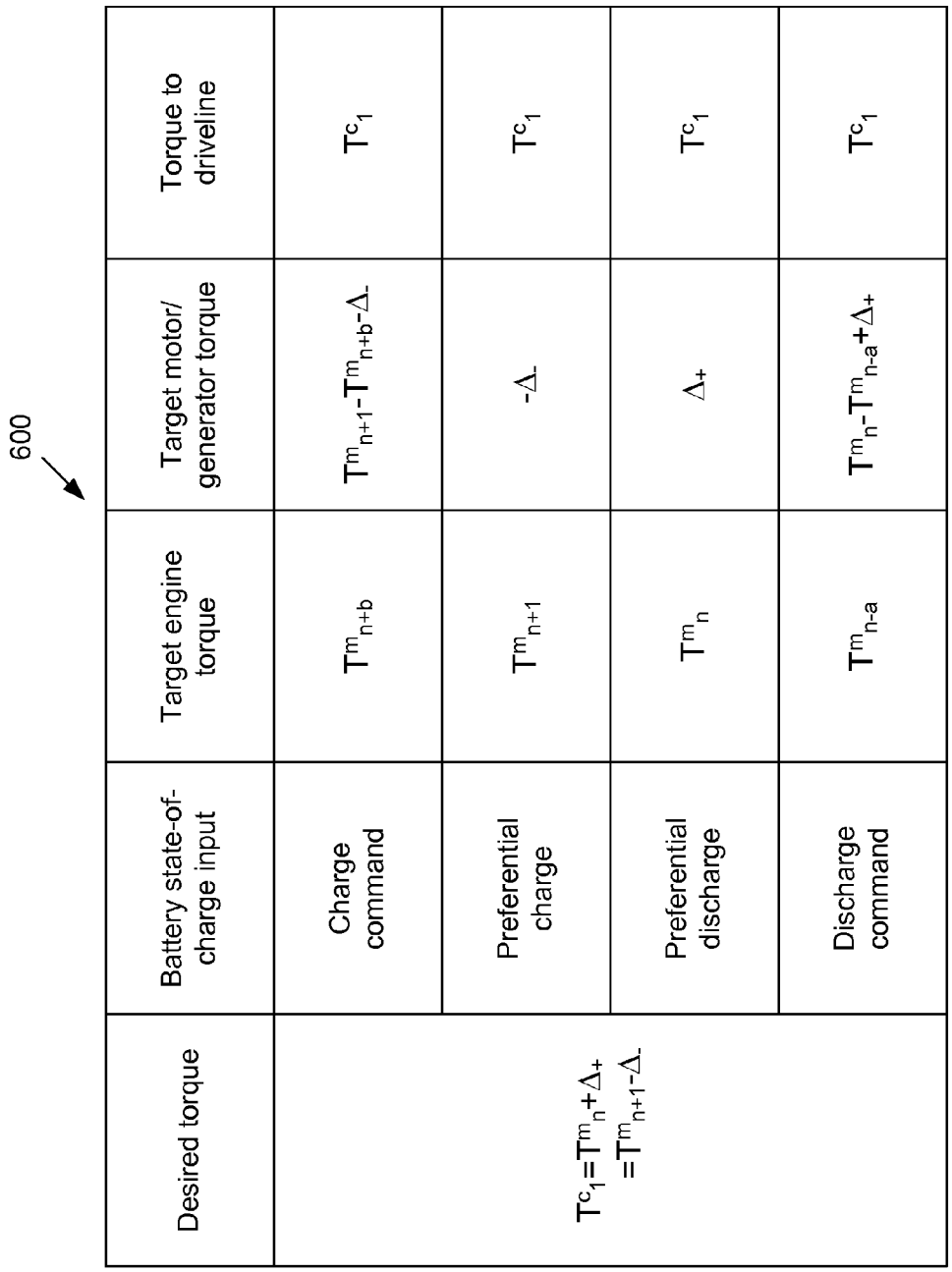
FIG. 6 is a chart illustrating the operation of an engine and a motor/generator based on the battery state of charge according to one embodiment of the present invention.

Referring next to the chart of FIG. 6, each of the above states helps indicate how the engine 104 and M/G 106 should be operated given the status of the battery. CHARGE COMMAND indicates that charging of the battery 108 is necessary or a high priority. This state may be generated because the charge level in the battery 108 has fallen below a particular critical threshold. In this case, the hybrid supervisory controller sends signals to the firing fraction calculator 412 to select a predetermined firing fraction (i.e., one of $FF_{n+1} \ldots FF_{n+b}$) that corresponds to a target engine torque level (i.e., one of $T^m_{n+1} \ldots T^m_{n+b}$) that is higher (and possibly much higher) than the desired torque level $T^c_1$. Generally, the target engine torque level is selected to optimize the charging of the battery and can be based on a wide variety of factors, including the charging profile for the battery, the state of the battery, the desired torque, etc. In this example, it is assumed that the target engine torque level is $T^m_{n+b}$. Since the target engine torque level for the engine 104 is higher than the desired torque level $T^c_1$, the excess power generated by the engine 104 may be stored. Based on input received from the hybrid supervisory controller 202, the M/G control unit 206 directs the M/G 106 to absorb the excess torque and use it to charge the battery 108. The torque generated by the electric motor/generator is negative and equals $T^c_1 - T^m_{n+b} = T^m_{n+1} - T^m_{n+b} - \Delta_-$. Accordingly, the net torque delivered to the driveline by the M/G 106 and the engine 104 is equal to the desired torque level $T^c_1$.

PREFERENTIAL CHARGE indicates that charging of the battery is preferred, but not an urgent priority. This state may be generated because the battery charge level is somewhat low but has not fallen below a particular critical threshold. In this case, the hybrid supervisory controller 202 sends signals to the firing fraction calculator 412 to select the predetermined firing fraction that corresponds to a torque level just above the desired torque level 502. Put another way, the selected firing fraction both 1) generates a torque higher than the desired torque $T^c{}_1$; and 2) generates a torque level that is closer to the desired torque level than any other torque level (i.e., $T^m{}_{n-a}, \ldots T^m{}_n, T^m{}_{n+1}, \ldots T^m{}_{n+b}$) that is associated with one of the predetermined firing fractions. In the example of FIGS. 5A and 6, the target engine torque level would thus be $T^m{}_{n+1}$. Since the target engine torque level for the engine 104 is higher than the desired torque level $T^c{}_1$, the excess power generated by the engine 104 may be stored. The target engine torque level, $T^m{}_{n+1}$, subtracted from the negative offset, $\Delta_-$, yields the desired torque level $T^c{}_1$. Based on input received from the hybrid supervisory controller 202, the M/G control unit 206 directs the M/G 106 to absorb the excess torque $\Delta_-$ and uses it to charge the battery 108. Alternatively, it may be decided that it is more desirable to bypass charging of the battery (or other energy storage device) and lower the MAC to produce the desired torque. Sometimes it may be decided to revert to continuously variable displacement operation (e.g., as described in U.S. Provisional Patent Application No. 61/672,144).

PREFERENTIAL DISCHARGE indicates that the discharging of the battery 108 is preferred, but not an urgent priority. This state may be generated because current operating conditions indicate that discharging of the battery and the addition of torque by the M/G would be beneficial, but is not necessary or urgent. In this case, the hybrid supervisory controller 202 sends instructions to the firing fraction calculator 412 to select the predetermined firing fraction that corresponds to a torque level just below the desired torque level $T^c{}_1$. Put another way, the selected firing fraction both 1) generates an engine torque lower than the desired torque $T^c{}_1$; and 2) generates a torque level that is closer to the desired torque level $T^c{}_1$ than any other torque level (i.e., $T^m{}_{n-a}, \ldots T^m{}_n, T^m{}_{n+1}, \ldots T^m{}_{n+b}$) that is associated with one of the predetermined firing fractions. In the example of FIGS. 5A and 6, this target engine torque level would be $T^m{}_n$. The positive offset (i.e., the difference between the lower torque level generated by the engine and the higher desired torque level $T^c{}_1$) is thus the desired torque level $T^c{}_1$ subtracted from the target engine torque level $T^m{}_n$ yielding a positive offset of $\Delta_+$. Based on input received from the hybrid supervisory controller, the M/G control unit directs the M/G to discharge the battery and add torque $\Delta_+$ to compensate for the torque deficit so that the desired torque $T^c{}_1$ is delivered by a combination of the engine 104 and the M/G 106. Again, discharging can be bypassed, engine target torque raised to $T^m{}_{n+1}$ and MAC lowered to produce the desired torque. Sometimes it may be decided to operate the engine in "standard" skip-fire mode.

DISCHARGE COMMAND indicates that the discharging of the battery 108 is a high priority. This state may be generated because the battery is full or near full and/or because current conditions are particularly suitable for generating torque using the battery and electric M/G. In this case, the engine control unit 204 receives input from the hybrid supervisory controller 202. Based on the input, the firing fraction calculator 412 of the engine control unit 204 selects a firing fraction (i.e., one of $FF_{n-a} \ldots FF_n$) that corresponds to a suitable target engine torque level. The target engine torque level is selected to optimize the discharging of the battery and can be based on a wide variety of factors, including the battery design, the desired torque, fuel efficiency-related considerations and/or other operating conditions. In this example, it is assumed that the target engine torque is $T^m{}_{n-a}$, is substantially below the desired torque $T^c{}_1$. The M/G control unit 206 receives input from the hybrid supervisory controller 202 and, based on the input, operates the M/G 106 to generate a target motor torque, which is positive. Thus, the M/G 106 and the engine 104 collectively deliver a torque level equal to the command torque, i.e. $T^m{}_{n-a}+T^m{}_a-T^m{}_{n-a}+\Delta_+=T^m{}_n+\Delta_+=T^c{}_1$.

For high required torque levels ($>T^m{}_{n+b}$), it is possible to operate the engine in an "all-fire" mode with all cylinders firing, and still add torque from the M/G unit, as is commonly done today. This allows generation of higher output torque levels than can be achieved solely by use of the IC engine.

In some embodiments, there may be more or fewer states for the battery 108 and the states may have somewhat different characteristics and implications. For example, some designs may include a SATISFACTORY CHARGE state. This state can indicate that the battery is adequately charged and that the battery state of charge need not be taken into account by the hybrid supervisory controller. The hybrid supervisory controller 202 may then operate the engine 104 and the M/G 106 based on other considerations. It should be appreciated that the above control scheme represents only one example embodiment of the present invention and can vary widely, depending on the needs of a particular application.

Additionally, there may be other driving conditions or parameters, aside from the state of the battery, which may influence a determination as to whether a battery charge or discharge is appropriate. For example, the vehicle may have a GPS antenna or other sensors that are arranged to detect when the vehicle is on its way to or close to a charging station (e.g., on the way home or to a known location with a charger). In this embodiment, even if the battery is not fully charged, the engine 104 and M/G 106 is operated to discharge the battery to improve fuel efficiency (e.g., as with the PREFERENTIAL DISCHARGE and DISCHARGE COMMAND states described above), since a charge is expected to take place soon. In various implementations, the hybrid powertrain controller 102 is arranged to take into account an array of different driving conditions and operational parameters in determining the torque output of the engine 104 and the M/G 106 at any given moment.

To use another example, consider a vehicle that is decelerating and that has entered a mode commonly referred to as deceleration fuel cut off (DFCO). In this mode, the working chambers are deactivated and no fuel (and possibly neither air nor fuel) is delivered to them. When all the working chambers are deactivated for a period of time, no air is delivered from the intake manifold into the working chambers and air continues to flow into the intake manifold through the throttle valve, even if the throttle valve is mostly closed. As a result, the MAP tends to equalize with atmospheric pressure. When working chambers are fired again (e.g., to prevent a stall or due to pressing of the accelerator pedal by the driver), the amount of engine torque may be higher than desirable, because the high MAP causes large amounts of air to be delivered into the fired working chambers. In some embodiments, the hybrid powertrain controller and/or the supervisory powertrain controller detects one or more of the above conditions and helps direct the electric M/G to absorb some of the torque generated by the engine. That is, the actions described above in connection with the CHARGE COMMAND may be performed.

Figure 7A:
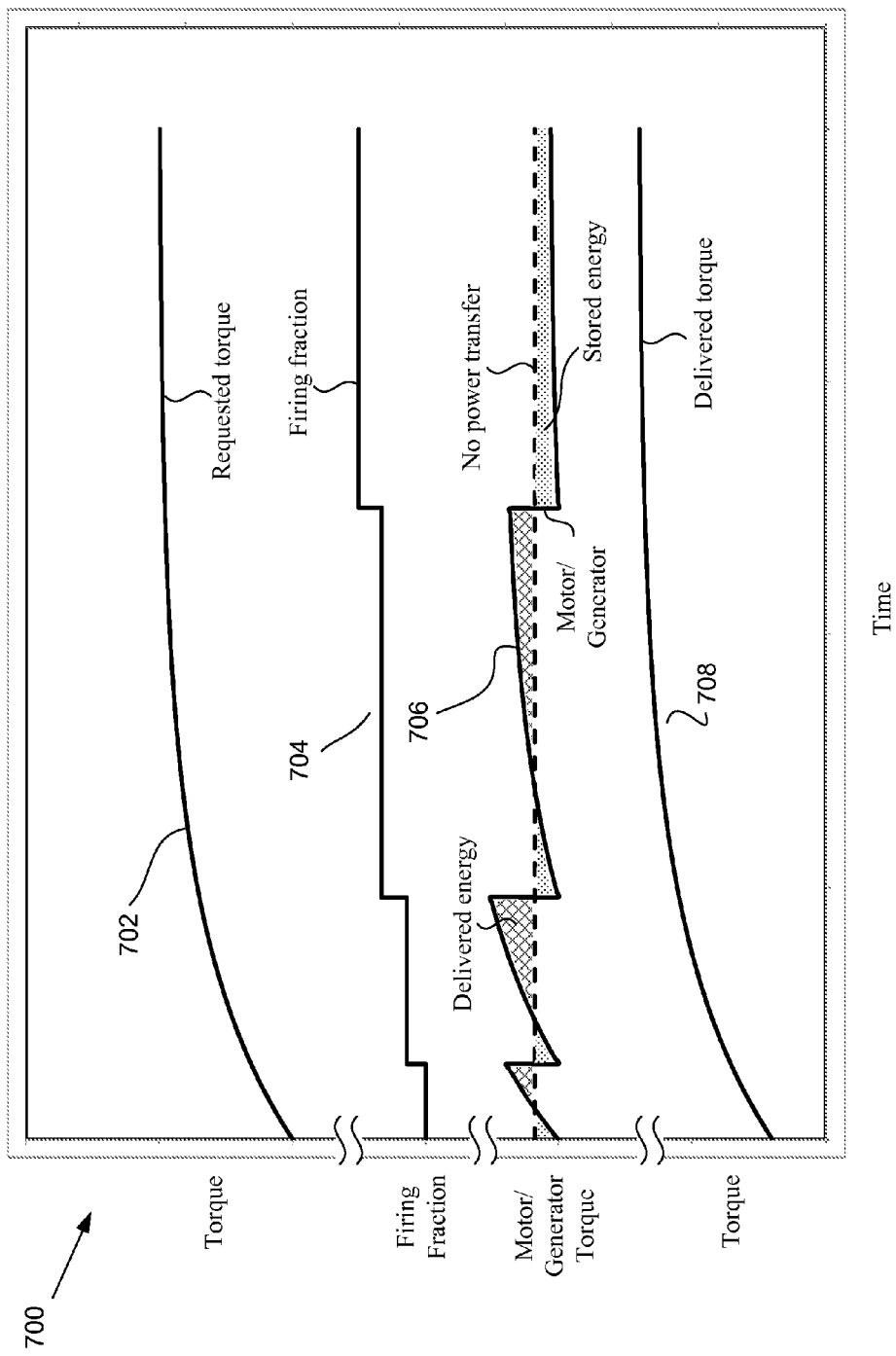
FIGS. 7A and 7B are graphs illustrating the operating characteristics of an engine and a motor/generator according to one embodiment of the present invention.

Referring next to FIG. 7A, a graph 700 illustrating example torque contributions by the engine 104 and the electric M/G 106 according to one embodiment of the present invention are described. The graph 700 provides four curves. Curve 702 illustrates a steady increase in the desired torque over time. Accordingly, the hybrid supervisory control unit 202 directs the engine control unit 204 and firing fraction calculator 412 to steadily increase the firing fractions, as shown by the step increases in curve 704. The hybrid supervisory control unit 202 coordinates the operation of the M/G 106 with the output of the engine 104. Curve 706 reflects how the M/G 106 at different times adds and subtracts torque, so that overall torque output from both the M/G 106 and the engine 104 approximates the desired torque output. This match is represented by curve 708, which represents the actual delivered torque and approximates curve 702, which represents the desired torque.

Figure 7B:
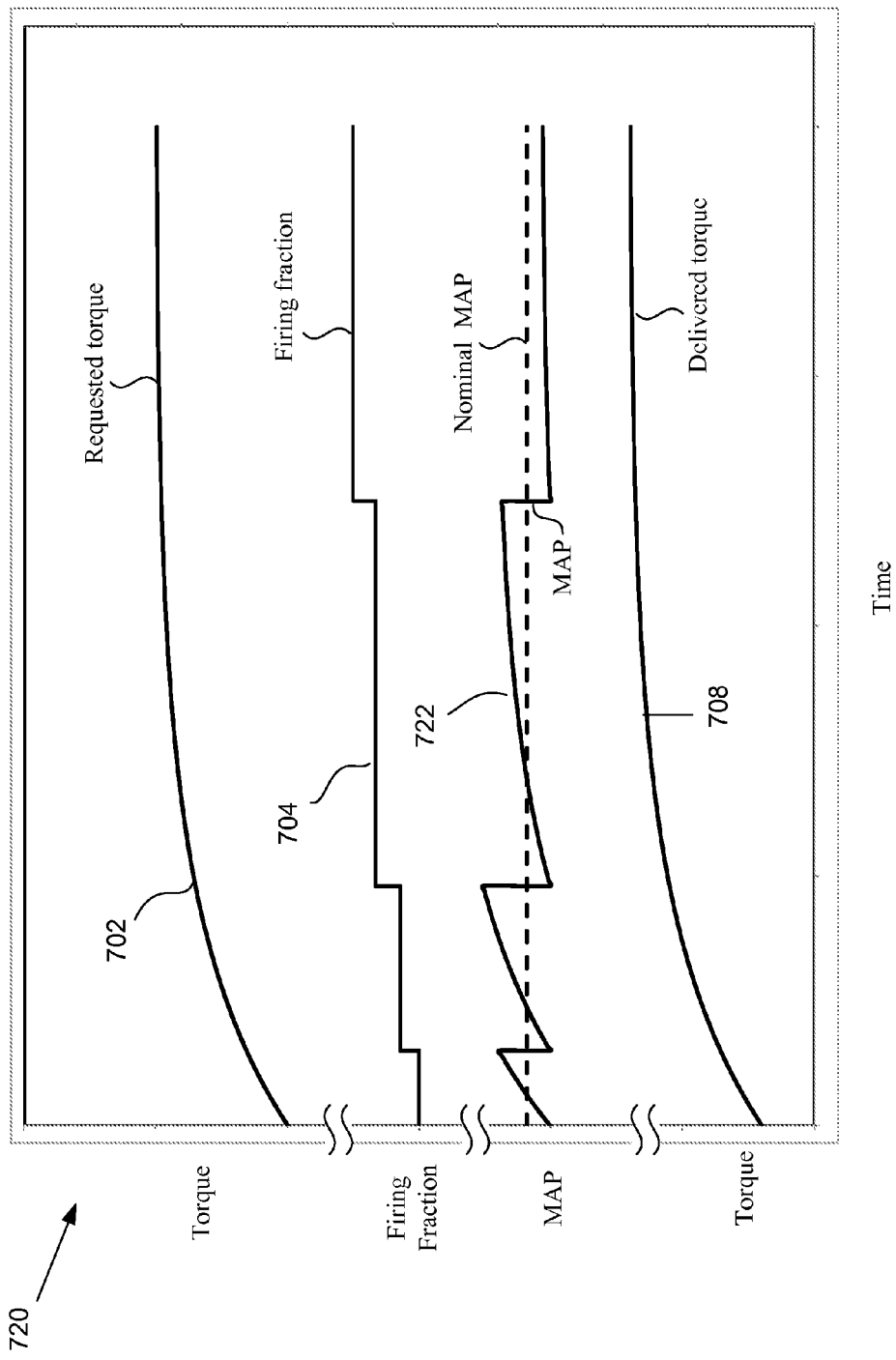

By way of comparison, FIG. 7B is a graph 720 that illustrates an example situation in which the throttle, rather than the M/G 106, is used to adjust engine torque so that it matches the desired torque. Graph 720 includes curves 702, 704 and 708 of FIG. 7A, as well as curve 722, which indicates fluctuations in the manifold absolute pressure (MAP) during the same period. In this example, the throttle is frequently adjusted to increase or decrease the MAP when a particular firing fraction would generate less or more engine torque then the desired torque. Adjusting the MAP in this manner, rather than using the M/G as in FIG. 7A, may be less efficient. That is, energy is lost when working chambers are fired under partial throttle instead of full (or near full) throttle. If the M/G 106 is used to match the engine output with the desired torque, then such energy, rather than being wasted, can instead be stored in the battery 108. Although FIGS. 7A and 7B focus on using the M/G 106 and the MAP, respectively, to control torque output, it should be appreciated that the present invention also contemplates approaches in which both the M/G 106 and the MAP/throttle are used to control torque output.

The above examples involve a hybrid powertrain controller and engine control unit that involve skip fire engine operation. The present invention also contemplates designs in which variable displacement engine control is used. Examples of such a design will be described with reference to FIG. 2 and FIG. 8.

Figure 8:
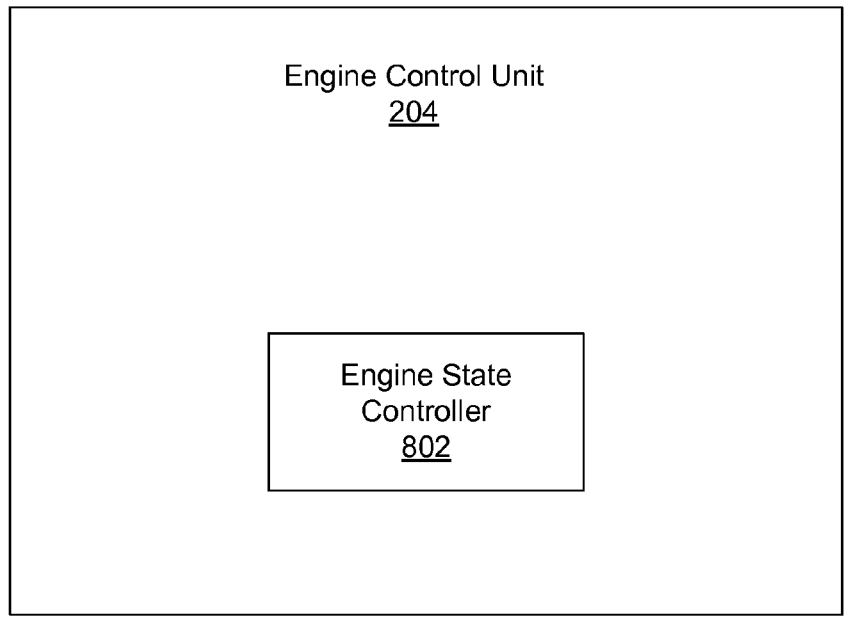
FIG. 8 is a diagram of an engine control unit using variable displacement engine control according to one embodiment of the present invention.

FIG. 8 illustrates an engine control unit 204 that uses variable displacement engine control in accordance with a particular embodiment of the present invention. The illustrated engine control unit can be the engine control unit 204 of FIG. 2. The engine control unit 204 includes an engine state controller 802, which receives input from the hybrid supervisory controller 202. Based on the input from the hybrid supervisory controller 202, the engine state controller 802 is arranged to select an engine state that delivers a particular target engine torque level. Each engine state involves firing a particular set of working chambers and deactivating the others. For example, in an eight cylinder engine, there may be nine engine states (i.e., firing 0-8 cylinders).

Prior art variable displacement designs open and close the throttle to adjust the manifold absolute pressure (MAP) and control the amount of torque that is generated by each fired cylinder. This allows for a fine-tuning of the overall torque generated by the engine. A disadvantage, however, is that firing a cylinder under partial throttle is generally less efficient relative to a cylinder that is fired under optimal conditions e.g., near full throttle. In the illustrated embodiment, the engine state controller is generally arranged to direct the engine to fire working chambers while the throttle is kept substantially open to maintain a high target MAP. For example, opening the throttle to maintain a MAP target greater than 70 kPa, 80 kPa, 90 kPa, or 95 kPa work well for various applications. The MAP target values may be adjusted depending on the local atmospheric pressure; for example, they may be lower at high elevations. Also the MAP targets may be higher if the engine is turbo- or super-charged and not naturally aspirated. In various embodiments, the throttle is positioned to keep the MAP substantially constant and substantially independent of or uncorrelated with changes in requested torque, although the MAP may fluctuate slightly (e.g., in a band around a target MAP).

Since the throttle is not used as a primary means to adjust the amount of torque generated by each fired working chamber, the hybrid supervisory controller 202 and the engine state controller 802 are limited to directing the engine to generate a predetermined set of target engine torque levels that each correspond to a particular engine state or number of fired working chambers. To provide additional control over the total amount of torque that is delivered to the driveline, the hybrid supervisory controller 202 and M/G control unit 206 direct the M/G 106 to add torque to or subtract torque from the drive shaft.

Figure 9:
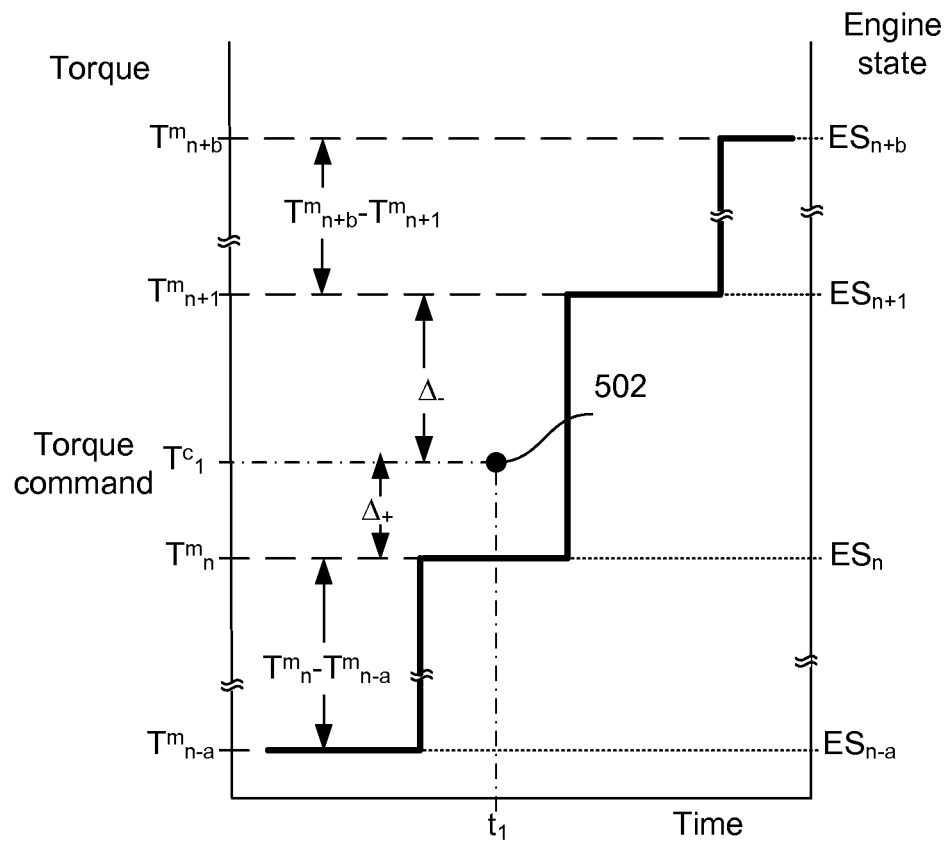
FIG. 9 is a graph illustrating different possible engine torque levels and engine states according to one embodiment of the present invention.

There are a wide variety of control systems that can be used to determine the distribution of torque generation between the M/G 106 and the engine 104. One approach would be similar to what was described in connection with FIGS. 5 and 6, except that engine states are used instead of firing fractions, as shown in FIG. 9. That is, each of the torque levels $T^m_{n-a}, \ldots T^m_n, T^m_{n+1}, \ldots T^m_{n+b}$ of FIG. 9 can be understood as referring to different torque levels corresponding to different engine states (rather than firing fractions), which are identified as $ES_{n-a}, \ldots ES_n, ES_{n+1}, \ldots ES_{n+b}$, in FIG. 9. As previously discussed, the battery state of charge control unit 208 would monitor the state of the battery and indicate its state (e.g., CHARGE COMMAND, DISCHARGE COMMAND, PREFERENTIAL CHARGE, PREFERENTIAL DISCHARGE) to the hybrid supervisory unit 202. Based on the battery state of charge and the desired torque level $T^c_1$, the hybrid supervisory unit 202 then sends a signal to the engine control unit 204 and the engine state controller 802 that helps indicate which target engine torque level and/or corresponding engine state should be used to operate the engine 104. The hybrid supervisory unit 202, the engine control unit 204 and the M/G control unit 206 would then operate the engine 104 and M/G 106 to collectively deliver the desired torque level $T^c_1$ as indicated in FIG. 6.

In various implementations involving a fixed set of firing fractions or engine states, the amount of energy delivered into (or withdrawn from) the energy storage device will vary over time based on the difference between the net torque requirement and the engine torque delivered at any given time by a particular firing fraction or engine state. The magnitude and timing of the energy delivery into (or withdrawal from) the energy storage device can vary greatly depending on various operating parameters. For example, engine state or firing fractions may be chosen to generate a specific charging pattern (e.g., a pulse charging pattern or a trickle charging pattern) that delivers energy into the energy storage device in an optimal manner. During some periods, there may be constant or frequent switching between recharging and charging states.

In embodiments in which the firing fractions are not limited to a specific set, then the skip fire mode can be arranged to deliver almost any desired level of engine torque. The amounts of delivered engine torque and energy absorption or torque generation by the M/G may vary constantly over time.

The engine torque can be adjusted as needed to generate any suitable charging pattern for the charging of the energy storage device.

In some embodiments, various engine parameters may be adjusted to fine tune the torque output of each fired working chamber. For example, the variable camshaft position, the fuel injection parameters, the throttle position and/or the spark timing may be modulated as appropriate. Although it is preferred that the throttle be kept substantially open, this is not a requirement, nor does it necessarily mean that the throttle must be kept in a static state during engine operation.

FIG. 2 as well as the other figures refer to subcomponents that perform various functions. It should be appreciated that some of these subcomponents may be combined into a larger single component, or that a feature of one subcomponent may be transferred to another subcomponent. Generally, the present invention contemplates a wide variety of control methods and modules for performing the operations described herein, and is not limited to what is expressly shown in the figures.

While FIG. 1 and FIG. 2 show two possible powertrain configurations, the present invention also contemplates other embodiments. For example, instead of a single motor/generator, two or more motor/generators may be used. Consider an example in which two motor/generators are used, which are referred to below as motor/generator 1 and motor/generator 2. Motor/generator 1 may have a larger torque capacity than motor/generator 2 and may provide all required torque under certain conditions. Motor/generator 2 may be used to supply torque only under certain conditions, for example, high vehicle speeds. By combining the output of motor/generator 1 and motor/generator 2 using a planetary gear system it may be possible to have a transmission with a fixed gear ratio. This advantageously requires a simpler and less expensive transmission and may allow both motor/generators to operate in a high efficiency region.

Motor/generator 1 and motor/generator 2 may be operatively connected to a single storage battery or they may have individual batteries. The multiple motor/generators may be controlled in a manner similar to that shown in FIG. 6. The sum of all the motor/generator torques can replace the single motor/generator torque column shown in FIG. 6. Each individual electric motor/generator may be charged or discharged to optimize the overall vehicle performance. In some cases one motor/generator may be charging, while the other motor is discharging. In some cases a motor/generator may function solely as a motor or solely as a generator.

In the specification and the claims, there are references to a "motor/generator." It should be appreciated that any such reference can mean a motor, a generator or a device that is capable of being operated as both a motor and a generator.

In many preferred implementations the firing timing determining module 420 (or equivalent functionality) makes a discrete firing decision on a working cycle by working cycle basis. This does not mean that the decision is necessarily made at the same time as the actual firing. Thus, the firing decisions are typically made contemporaneously, but not necessarily synchronously, with the firing events. That is, a firing decision may be made immediately preceding or substantially coincident with the firing opportunity working cycle, or it may be made one or more working cycles prior to the actual working cycle. Furthermore, although many implementations independently make the firing decision for each working chamber firing opportunity, in other implementations it may be desirable to make multiple (e.g., two or more) decisions at the same time.

Some engines may be equipped with various subsystems that influence the amount of engine firing. For example, the engine may have a turbocharger with variable air paths, variable length intake runners, or variable exhaust paths. All of these subsystems can be incorporated as different elements in this invention.

The invention has been described primarily in the context of controlling the firing of 4-stroke piston engines suitable for use in motor vehicles. However, it should be appreciated that the described skip fire approaches are very well suited for use in a wide variety of internal combustion engines. These include engines for virtually any type of vehicle—including cars, trucks, boats, construction equipment, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of two stroke piston engines, diesel engines, Otto cycle engines, Dual cycle engines, Miller cycle engines, Atkinson cycle engines, Wankel engines and other types of rotary engines, mixed cycle engines (such as dual Otto and diesel engines), radial engines, etc. It is also believed that the described approaches will work well with newly developed internal combustion engines regardless of whether they operate utilizing currently known, or later developed thermodynamic cycles.

In some applications it will be desirable to provide skip fire control as an additional operational mode to a more conventional mode of operation. This allows the engine to be operated in a conventional mode when desired.

In some preferred embodiments, the firing timing determining module 420 utilizes sigma delta conversion. Although it is believed that sigma delta converters are very well suited for use in this application, it should be appreciated that the converters may employ a wide variety of modulation schemes. For example, pulse width modulation, pulse height modulation, CDMA oriented modulation or other modulation schemes may be used to deliver the drive pulse signal. Some of the described embodiments utilize first order converters. However, in other embodiments higher order converters may be used.

Although only a few embodiments of the invention have been described in detail, it should be appreciated that the invention may be implemented in many other forms without departing from the spirit or scope of the invention. For example, the drawings and the embodiments sometimes describe specific arrangements, operational steps and control mechanisms. It should be appreciated that these mechanisms and steps may be modified as appropriate to suit the needs of different applications. FIG. 4 illustrates an engine control unit 204 with a firing fraction calculator 412 and a firing timing determining module 420. In the aforementioned co-assigned applications and patents, there are descriptions of various types of skip fire engine control modules. Any of these modules, including firing fraction calculators, firing timing determining modules, filters, power train parameter adjusting modules, etc., may be integrated into the engine unit 204. Any reference to a battery may be replaced with any other suitable type of energy storage device (e.g., a flywheel, a hydraulic energy storage device, a capacitor, etc.). Various example methods are described herein that relate to how engine firing fractions, engine torque or M/G operation are determined. The present invention also contemplates additional methods that are not explicitly described above but that also coordinate the M/G and engine to generate a desired torque. For example, in some embodiments, the desired torque is determined by the torque calculator. A firing fraction is then determined separately that generates an engine torque higher or lower than the desired torque. In other embodiments, the torque calculator directly determines a total desired torque that accounts for the torque to be added or subtracted by one or more motor/generators. The engine control unit then directs the engine to deliver the desired total torque in a skip fire manner using an appropriate firing fraction. In the description and the figures, particular embodiments are described that involve a fixed or predetermined set of firing fractions. It should be noted, however, that the number of available firing fractions may change based on various operating parameters, such as engine speed or gear. The above description and figures also sometimes refer to a motor/generator. Any mentioned motor/generator could be replaced with more than one motor/generator, which cooperate to subtract or add torque from the powertrain. Therefore, the present embodiments should be considered illustrative and not restrictive and the invention is not to be limited to the details given herein.

What is claimed is:

1. A hybrid powertrain controller for a vehicle with at least one electric motor/generator and an internal combustion engine having a plurality of working chambers, the hybrid powertrain controller comprising:
    an engine control unit arranged to operate the engine in a variable displacement mode in which some, but not all of the working chambers are fired to add torque to a powertrain of the vehicle and wherein unfired working chambers are deactivated during unfired working cycles, the variable displacement mode having a fixed set of operational states and wherein during operation in the variable displacement mode, an air intake throttle of the engine is held at a substantially fixed position even through some variations in a desired torque output; and
    a motor/generator control unit arranged to operate the at least one electric motor/generator to add torque to or subtract torque from the powertrain of the vehicle wherein the hybrid powertrain controller is arranged to coordinate operation of the engine and the at least one electric/motor generator to deliver the desired torque.

2. A hybrid powertrain controller as recited in claim 1 wherein the air intake throttle helps keep the manifold absolute pressure substantially constant and substantially independent of changes in requested torque.

3. A hybrid powertrain controller as recited in claim 1 wherein the throttle is positioned to maintain a manifold air pressure of greater than one selected from the group consisting of 70, 80 90 and 95 kPa while any working chambers are being fired.

4. A hybrid powertrain controller as recited in claim 1 wherein the variable displacement mode is a skip fire operational mode and wherein each variable displacement operational state involves a different firing fraction.

5. A hybrid powertrain controller as recited in claim 4 wherein in the skip fire operational mode, the engine is arranged to operate at a firing fraction selected from a fixed set of available firing fractions, wherein at least some of the available firing fractions are arranged such that certain working chambers will sometimes be fired and sometimes be skipped while the engine is operating at such firing fraction.

6. A hybrid powertrain controller as recited in claim 5 wherein the number of available firing fractions may vary as a function of the operational state of the engine.

7. A hybrid powertrain controller as recited in claim 6 wherein the number of available firing fractions varies as a function of one selected from the group consisting of engine speed and gear.

8. A hybrid powertrain controller as recited in claim 1 wherein each variable displacement operational state has an associated first set of working chambers that are fired each working cycle and a second set of working chambers that are skipped each working cycle.

9. A hybrid powertrain controller as recited in claim 1 further comprising:
    a supervisory hybrid controller arranged to coordinate operation of the engine and the at least one motor/generator so that the desired torque is delivered to the powertrain;
    a torque calculator that is arranged to calculate the desired torque based on a plurality of inputs, including an accelerator pedal of the vehicle; and
    a state of charge control unit arranged to monitor state of charge of an energy storage device of the vehicle.

10. A hybrid powertrain controller as recited in claim 9 wherein:
    the state of charge control unit is arranged to indicate a desired charge state selected from a group including a charge command state and a discharge command state;
    the engine control unit is arranged to select one of a plurality of predetermined firing fractions based at least in part on the desired charge state;
    when the desired charge state is the charge command state, the engine control unit selects a firing fraction that delivers more than the desired torque under the current operating conditions, and the electric motor/generator control unit is arranged to operate the at least one electric motor/generator to charge the energy storage device; and
    when the desired charge state is the discharge command state, the engine control unit preferentially selects a firing fraction that delivers less than the desired torque under the current operating conditions, and the electric motor/generator control unit is arranged to operate the at least one electric motor/generator to add torque to the powertrain.

11. A hybrid powertrain controller as recited in claim 10 wherein:
    the group from which the desired charge state is selected further includes a preferred charge state and a preferred discharge state;
    the plurality of predetermined firing fractions includes a first firing fraction and a second firing fraction that deliver more and less torque, respectively, than the desired torque under the current operating conditions wherein the torque delivered by the first and second firing fractions are closer to the desired torque than torque delivered by any of the other predetermined firing fractions under the current operating conditions;
    when the desired charge state is the preferred charge state, the engine control unit preferentially selects the first firing fraction, which delivers more than the desired torque under the current operating conditions, and the electric motor/generator control unit is arranged to operate the at least one electric motor/generator to charge the energy storage device; and
    when the desired charge state is the preferred discharge state, the engine control unit preferentially selects the second firing fraction, which delivers less than the desired torque under the current operating conditions, and the electric motor/generator control unit is arranged to operate the at least one electric motor/generator to add torque to the powertrain.

12. A method for operating a hybrid powertrain in a vehicle with at least one electric motor/generator and an internal combustion engine having a plurality of working chambers, the method comprising:
operating the engine in a variable displacement mode in which some, but not all of the working chambers are fired to add torque to a powertrain of the vehicle and wherein unfired working chambers are deactivated during unfired working cycles, the variable displacement mode having a fixed set of operational states and wherein during operation in the variable displacement mode, an air intake throttle of the engine is held at a substantially fixed position for extended periods even through variations in a desired torque output; and
operating the at least one electric motor/generator to add torque to or subtract torque from a powertrain of the vehicle; and
coordinating operation of the engine and the at least one electric/motor generator to deliver the desired torque.

13. A method as recited in claim 12 wherein selection of the fired working chambers and control of the at least one motor/generator, and not the throttle, are used as the primary adjustment mechanisms to facilitate delivery of the desired torque even through variations in the desired torque.

14. A method as recited in claim 12 further comprising positioning the throttle to maintain a manifold air pressure of greater than one selected from the group consisting of 70, 80, 90 and 95 kPa while any working chambers are being fired.

15. A method as recited in claim 12 wherein the variable displacement mode is a skip fire operational mode and wherein each variable displacement operational state involves a different firing fraction.

16. A method as recited in claim 15 wherein in the skip fire operational mode, the engine is operated at a firing fraction selected from a fixed set of available firing fractions, wherein at least some of the available firing fractions are arranged such that certain working chambers will sometimes be fired and sometimes be skipped while the engine is operating at such firing fraction.

17. A method as recited in claim 12 wherein each variable displacement operational state has an associated first set of working chambers that are fired each working cycle and a second set of working chambers that are skipped each working cycle.

18. A method as recited in claim 12 further comprising:
receiving input from a state of charge control unit indicating a desired charge state selected from a group including a charge command state and a discharge command state;
selecting one of a plurality of predetermined firing fractions based at least in part on the desired charge state;
when the desired charge state is the charge command state, selecting a firing fraction that delivers more than the desired torque under the current operating conditions and operating the at least one electric motor/generator to charge the energy storage device; and
when the desired charge state is the discharge command state, selecting a firing fraction that delivers less than the desired torque under the current operating conditions and operating the at least one electric motor/generator to add torque to the powertrain.

19. A method as recited in claim 18 wherein:
the plurality of predetermined firing fractions includes a first firing fraction and a second firing fraction that deliver more and less torque, respectively, than the desired torque under the current operating conditions wherein the torque delivered by the first and second firing fractions are closer to the desired torque than torque delivered by any of the other predetermined firing fractions under the current operating conditions;
the group from which the desired charge state is selected further includes a preferred charge state and a preferred discharge state, the method further comprising:
when the desired charge state is the preferred charge state, selecting the first firing fraction, which delivers more than the desired torque under the current operating conditions, and operating the at least one electric motor/generator to charge the energy storage device; and
when the desired charge state is the preferred discharge state, selecting the second firing fraction, which delivers less than the desired torque under the current operating conditions, and operating the at least one electric motor/generator to add torque to the powertrain.

* * * * *